United States Patent [19]

Tessler et al.

[11] 4,379,919

[45] Apr. 12, 1983

[54] STARCH SULFOMALEATE HALF-ESTERS, A METHOD FOR THEIR PREPARATION AND THEIR USE TO PREPARE STARCH DISULFOSUCCINATE HALF-ESTERS

[75] Inventors: Martin M. Tessler, Edison; Otto B. Wurzburg, Whitehouse Station; Teresa A. Dirscherl, Netcong, all of N.J.

[73] Assignee: National Starch and Chemical Corporation, Bridgewater, N.J.

[21] Appl. No.: 364,376

[22] Filed: Apr. 1, 1982

[51] Int. Cl.³ ............... C08B 31/04; C08B 31/16
[52] U.S. Cl. .................. 536/108; 536/107; 536/109; 536/110
[58] Field of Search ............ 536/107, 108, 109, 110

[56] References Cited

U.S. PATENT DOCUMENTS

| 2,825,727 | 3/1958 | Caldwell | 536/107 |
| 2,884,412 | 4/1959 | Neukom | 536/106 |
| 2,891,947 | 6/1959 | Paschall et al. | 536/110 |
| 2,961,440 | 11/1960 | Kerr et al. | 106/210 |
| 2,989,520 | 6/1961 | Rutenberg | 536/50 |
| 3,077,469 | 2/1963 | Aszalos | 536/111 |
| 3,459,632 | 8/1969 | Caldwell et al. | 536/50 |
| 3,706,771 | 12/1972 | Kremers et al. | 260/501.15 |
| 3,756,966 | 9/1973 | Lamberti | 536/109 |
| 3,791,838 | 2/1974 | Kaplan | 106/210 |
| 3,904,601 | 9/1975 | Tessler et al. | 536/106 |
| 3,910,880 | 10/1975 | Lamberti | 536/109 |
| 3,987,043 | 10/1976 | Lamberti | 260/501.15 |
| 4,029,544 | 6/1977 | Jarowenko et al. | 162/175 |
| 4,061,610 | 12/1977 | Glowaky et al. | 536/110 |
| 4,119,487 | 10/1978 | Tessler | 536/50 |
| 4,139,699 | 2/1979 | Hernandez et al. | 106/210 |
| 4,239,592 | 12/1980 | Gaspar et al. | 162/175 |
| 4,243,479 | 1/1981 | Tessler | 162/175 |

*Primary Examiner*—Ronald W. Griffin
*Attorney, Agent, or Firm*—Edwin M. Szala; Margaret B. Kelley

[57] ABSTRACT

Novel starch sulfomaleate half-esters are prepared by reacting a starch base or a modified starch containing anionic, cationic, and/or nonionic substituent groups with about 0.1 to 100% by weight of sulfomaleic anhydride or its salts. The reaction is carried out at pH 5–9 and at 5°–90° C. for 0.5–20 hours or at pH 9–11 and at 5°–30° C. for about 0.5–3 hours. The starch sulfomaleates may be reacted with sulfurous acid or its acid salts (e.g. sodium bisulfite) to form the novel starch disulfosuccinate.

14 Claims, No Drawings

STARCH SULFOMALEATE HALF-ESTERS, A METHOD FOR THEIR PREPARATION AND THEIR USE TO PREPARE STARCH DISULFOSUCCINATE HALF-ESTERS

BACKGROUND OF THE INVENTION

This invention relates to novel starch sulfomaleate half-esters and to a method for their preparation. It also relates to modified starch sulfomaleate derivatives which contain other substituent groups on the starch base. It further relates to novel starch disulfosuccinate half-esters and their preparation.

Starch esters containing sulfonyl groups, including the sulfosuccinates, have been prepared by treating granular starch in an aqueous suspension with the cyclic dibasic acid anhydrides of ethyleneically unsaturated organic acids (e.g. maleic, citraconic, itaconic, and crotonic acid) and treating the resulting unsaturated starch half-esters with sodium, potassium, or ammonium bisulfite to form the saturated half-esters containing sulfonyl groups by addition across the double bond (see U.S. Pat. No. 2,825,727 issued Mar. 4, 1958 to C. G. Caldwell). Amphoteric sulfosuccinates of fluidity starches have been used as pigment retention aids in high alum systems (see U.S. Pat. No. 4,029,544 issued June 14, 1977 to W. Jarowenko et al.). They are prepared using the general procedure of the Caldwell patent, i.e. a granular fluidity starch base (4-40 W.F.) containing cationic or cationogenic substituent groups is reacted with maleic anhydride to form the starch succinate and then with a bisulfite to form the sulfosuccinate. In addition to the controlled amounts of cationic quaternary ammonium ether groups or cationogenic aminoalkyl ether groups and sulfosuccinate groups, the derivatives may contain other substituent groups such as phosphate, hydroxypropyl, or acetate groups.

As used herein, the term "amphoteric" starch derivatives refers to starch derivatives where anionic and cationic (or cationogenic) groups are bonded to the same or to different reaction sites on the starch molecule through a zwitterionic substituent group or through separate anionic and cationic (or cationogenic) substituent groups. The term "cationic" groups is hereafter intended to include cationogenic groups, which are nonionic substituent groups capable of forming cations (e.g. diethylaminoethyl ether groups).

The present invention provides novel starch sulfomaleate half-esters and a method for their preparation. It also provides modified starch sulfomaleate derivatives which contain other substituent groups. It further provides novel starch disulfosuccinate half-esters prepared by reacting the starch sulfomaleate with a bisulfite.

SUMMARY OF THE INVENTION

Novel starch sulfomaleate half-ester derivatives having the following general structure are provided:

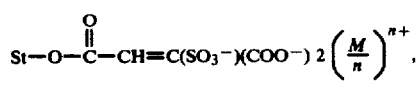

(i)

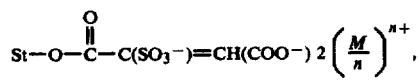

(ii)

or mixtures of (i) and (ii); wherein St—O represents a starch molecule or a modified starch molecule (wherein the hydrogen of a hydroxyl group of an anhydroglucose unit has been replaced as shown), M is a cation, and n is the valence number of M.

Novel starch disulfosuccinate half-ester derivatives having the following general structure are also provided:

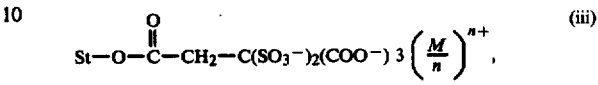

(iii)

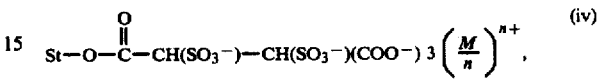

(iv)

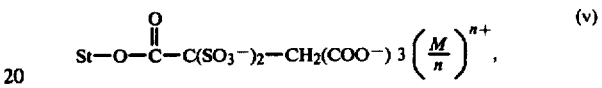

(v)

or mixtures of (iii), (iv) and (v); wherein St—O, M, and n are as defined hereinabove.

In the method herein, the starch sulfomaleates are prepared by reacting a starch base with about 0.1 to 100% by weight, based on dry starch, of sulfomaleic anhydride or its salts and isolating the resulting half-esters. The reactions are carried out in an aqueous medium at a pH of about 5-9 and a temperature of about 5°-90° C. for about 0.5-20 hours or at a pH of about 9-11 and at a temperature of about 5°-30° C. for about 0.5-3 hours.

The novel starch sulfomaleates may be modified to increase their anionic characteristics by the introduction of additional anionic substituent groups (e.g. 2-sulfo-2-carboxyethyl ether groups) into the starch molecule. They may also be modified to render them amphoteric by the introduction of cationic substituent groups (e.g. diethylaminoethyl ether groups or 3-(trimethylammonium chloride)-2-hydroxypropyl ether groups) or zwitterionic substituent groups (e.g. aminophosphonic acid or salt groups) into the starch molecule. They may also be modified by the introduction of nonionic substituent groups (e.g. hydroxypropyl ether groups) into the starch molecule. Such modifications are carried out prior to the reaction with the sulfomaleic anhydride if a high pH (i.e. greater than about 9) is required to catalyze these reactions. Reagents that react with starch at a pH below about 9 (e.g. acetic anhydride, propionic anhydride, succinic anhydride, and the like) can be reacted prior to, subsequent to, or simultaneously with the sulfomaleic anhydride reagent herein.

The starch sulfomaleates may be reacted with sulfurous acid or the acid salts thereof, such as sodium bisulfite, using the method of U.S. Pat. No. 2,825,727 (cited previously) to provide novel disulfosuccinate derivatives having enhanced anionic charcteristics. The disulfosuccinate derivatives may themselves be modified by the introduction of other substituent groups (anionic, cationic, zwitterionic, and/or nonionic) into the starch molecule prior to the reaction with sulfomaleic anhydride and subsequent reaction with the bisulfite.

The starch sulfomaleates, starch disulfosuccinates, and modified starch sulfomaleate and disulfosuccinate derivatives herein may be used as pigment retention aids and in other applications wherein starch derivatives are typically used, such as in coatings, sizes, adhesives, and the like.

DESCRIPTION OF THE PREFERRED EMBODIMENTS

The applicable starch bases which may be used in preparing the starch sulfomaleates and starch disulfosuccinate derivatives herein may be derived from any plant source including corn, potato, sweet potato, wheat, rice, sago, tapioca, waxy maize, sorghum, high amylose corn, or the like. Also included are the conversion products derived from any of the former bases including, for example, dextrins prepared by the hydrolytic action of acid and/or heat; oxidized starches prepared by treatment with oxidants such as sodium hypochlorite; fluidity or thin boiling starches prepared by enzyme conversion or mild acid hydrolysis; and derivatized and crosslinked starches. The starch base may be a granular starch or a gelatinized (i.e. non-granular) starch.

The starch reactions wth sulfomaleic anhydride to form the starch sulfomaleates herein are represented by the following equations:

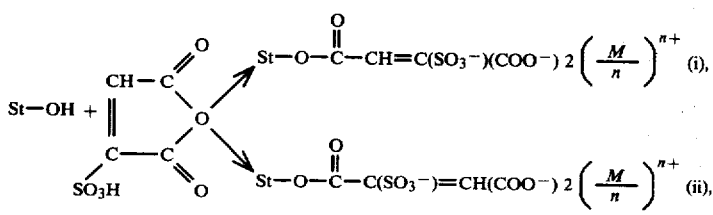

or mixture of (i) and (ii); wherein St is a starch base or modified starch base such as an anionic, cationic, zwitterionic, or nonionic starch and M is one or more cations depending upon the valence of M, preferably selected from the groups consisting of hydrogen, ammonium, alkali, and alkaline earth metals.

The reactions of the starch sulfomaleates, i.e. (i), (ii), or mixtures of (i) and (ii), with a bisulfite, (e.g. sodium bisulfite), to form the starch disulfosuccinates herein are represented by the folloing equations:

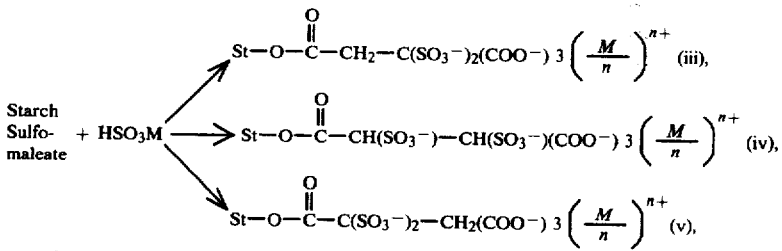

or mixtures of (iii), (iv), and (v); wherein St—O, M and n are as defined hereinabove.

The practitioner will recognize that these starch half-esters may be either acids, salts, or partial salts depending upon the pH of the solution wherein they are used. The practitioner will also recognize that the starch molecule is a polymer which contains many anhydroglucose units, each having three free hydroxyl groups (except the non-reducing end glucose units which contain four free hydroxyl groups) which may react with reagents. Thus, the number of such displacements or the degree of substitution (D.S.) will vary with the particular starch, the ratio of reagent to starch, and to some extent, the reaction conditions. Furthermore, since it is known that the relative reactivity of each of the hydroxyl groups within the anhydroglucose unit is not equivalent, it is probable that some will be more reactive with the reagent than others.

The sulfomaleic anhydride which reacts with the starch bases to form the starch sulfomaleates herein may be prepared using the sulfonation procedure of A. LeBerre, A. Etienne, and J. Coquelin, described in Bulletin Soc. Chim. Fr., No. 1, p. 214 (1973) or the procedure described in U.S. Pat. No. 3,987,043 issued Oct. 19, 1976 to V. Lamberti. In carrying out the sulfonation reaction, liquid sulfur trioxide is added slowly to the maleic anhydride. The sulfur trioxide is employed in a ratio of at least about 1 mole, preferably 1.1 to 1.5 moles, per mole of maleic anhydride.

The amount of sulfomaleic anhydride reagent to be employed in the starch reaction will vary from about 0.1–100% by weight, based on the weight of dry starch, depending on such factors as the starch base used and the degree of substitution required in the final product. In general, the preferred amount of reagent to be used is 1–20% by weight for granular starches, and 30–100% by weight for non-granular starches.

In the method of this invention, the sulfomaleic anhydride reagent is added in increments directly to an aqueous suspension of the starch (typically about 25–45% solids). Typically, the starch reaction is carried out at a pH of about 5–9 and at a temperature of about 5°–90° C. for about 0.5–20 hours or at a pH of about 9–11 at about 5°–30° C. for about 0.5–3 hours. The skilled practitioner will recognize that starch esters are hydrolyzed at high pH and therefore must be prepared using shorter reaction times and lower temperatures at higher pH reactions rather than lower pH (9 or less) reaction. When necessary, alkali is added to the starch slurry prior to the addition of the anhydride reagent to provide the desired pH. The pH is controlled during the reaction by the slow addition of alkali (e.g. sodium, potassium, or calcium hydroxide and the like). Preferably, the pH is controlled by the metered addition of 3% sodium hydroxide solution controlled by a pH-sensing device.

The reaction is carried out at a temperature from about 5°–90° C., preferably about 20°–45° C. The practitioner will recognize that the use of temperatures above about 60° C. with granular starches in an aqueous medium will result in granule swelling and filtration difficulties or in gelatinization of the starch.

The reaction mixture is agitated under the desired reaction conditions. The reaction may vary from about 0.5–20 hours, preferably about 1–6 hours, depending on such factors as the amount, stability, and reactivity of the sulfomaleic anhydride reagent, the temperature, the pH, the scale of the reaction, and the degree of substitution desired.

The preferred reaction conditions are about pH 6–9 and, about 20°–45° C. for about 1–6 hours using about 1–20% by weight of sulfomaleic anhydride reagent.

After completion of the reaction, the pH of the reaction mixture is adjusted, when necessary, to a value of from about 3 to 7 with any commercial acid such as hydrochloric, sulfuric, or acetic acid, and the like. Such acids may be conveniently added as a dilute aqueous solution.

Recovery of the resulting starch sulfomaleates may be readily accomplished with the particular method employed being dependent on the form of the starch derivative. If the resulting starch derivative is granular, it is recovered by filtration, preferably washed with water to remove any residual salts, and dried. Granular starch derivatives may also be drum-dried, spray-dried, or gelatinized and isolated by alcohol precipitation or freeze drying to form non-granular products. If the resulting starch derivative is non-granular, it may be purified by dialysis to remove residual salts and isolated by alcohol precipitation, freeze drying, or spray drying.

The starch disulfosuccinates herein are prepared by reacting the starch sulfomaleates (or modified starch sulfomaleates) with sulfurous acid or the acid salts thereof, such as potassium, ammonium, or preferably sodium bisulfite, as described in U.S. Pat. No. 2,825,727 cited previously. The amount of bisulfite added is dependent on the amount of sulfomaleic groups present in the reaction mixture. About a 2 to 7 fold excess of bisulfite is typically used. For sulfomaleic anhydride treatments of 0.1–100%, the amount of bisulfite will range from about 0.1 to 400% by weight, based on starch. The sulfite is slowly added to an aqueous suspension containing the starch sulfomaleate, and the mixture is allowed to react, under agitation, at a temperature of about 5° to 50° C., preferably ambient temperature, for about 1 to 6 hours, preferably 2 to 4 hours. After the reaction is completed, the resulting starch disulfosuccinate is recovered using the isolation procedures discussed hereinabove. The starch sulfomaleate need not be recovered prior to the bisulfite reaction, and the bisulfite may be added directly to the starch slurry after the anhydride reaction, provided the pH is at about 5–8, or adjusted to such a pH by the addition of dilute acid before the addition of bisulfite. The pH of the reaction mixture will decrease after the bisulfite addition.

Modified starch sulfomaleate derivatives and modified starch disulfosuccinate derivatives are prepared by reacting modified starch bases containing anionic, cationic, zwitterionic, and/or nonionic substituent groups with the appropriate reagent(s). Methods for the preparation of anionic starches (i.e. starches containing substituent groups such as carboxyalkyl, sulfoalkyl, sulfocarboxyalkyl, and phosphate groups), cationic starches (i.e. starches containing amino, sulfonium and phosphonium groups), and zwitterionic starches (i.e. starches containing aminophosphonic acid groups); and nonionic starches (i.e. starches containing hydroxyethyl, hydroxypropyl, and acetate groups) are well-known to those skilled in the art. Methods for the preparation of cationic and anionic starch derivatives are discussed in "Starch: Chemistry and Technology," Vol. II, ed. by R. L. Whistler and E. F. Pascall (Academic Press, New York 1967), pages 406–414 and 312–326, respectively. The preparation of anionic, cationic, nonionic, and crosslinked starch derivatives is also discussed in the "Handbook of Water-Soluble Gums and Resins," Chapter 22: Starch and Its Modifications, pp. 26–28 and 37–47, ed. by R. L. Davison (McGraw-Hill Book Co. New York 1980). For a discussion of methods for the introduction of phosphate groups, see U.S. Pat. No. 2,884,412 issued Apr. 28, 1959 to H. Neukom or U.S. Pat. No. 2,961,440 issued Nov. 22, 1960 to R. W. Kerr et al.; of sulfonium groups see U.S. Pat. No. 2,989,520 issued June 20, 1961 to M. W. Rutenberg et al.; phosphonium groups, see U.S. Pat. No. 3,077,469 issued Feb. 12, 1963 to A. Aszalos; aminophosphonic acid groups see U.S. Pat. No. 4,243,479 issued Jan. 6, 1981 to M. M. Tessler.

When conducting any of the above reactions with granular starches, it may sometimes be desirable to carry out the reaction in the presence of salts, e.g. sodium sulfate, in amounts of from about 10 to 40% by weight, based on dry starch. The presence of sodium sulfate acts to suppress swelling of the starch and gives a more filterable product. Sodium sulfate is not used in reactions where calcium hydroxide is used to adjust the pH.

The following examples will more fully illustrate the embodiments of this invention. In the examples, all parts and percentages are given by weight, and all temperatures are in degrees Celsius unless otherwise noted. In the Tables, all percentages are determined on a dry basis (D.B.), based on dry starch. The ester content of each starch ester was calculated from its saponification number.

EXAMPLE I

This example illustrates the preparation of starch sulfomaleates using a corn starch base.

PREPARATION OF THE SULFOMALEIC ANHYDRIDE REAGENT

The reagent was prepared using the sulfonation procedure of U.S. Pat. No. 3,987,043 (cited previously). Liquid sulfur trioxide (100 mole %) was added slowly to the agitated maleic anhydride powder while heating to maintain the temperature at 60° C. After the exothermic reaction was complete, the reaction temperature was raised to 100°–110° C. and the mixture was held for 3 hours. After cooling to room temperature, the viscous dark brown oil crystallized to solid sulfomaleic anhydride.

PREPARATION OF THE STARCH SULFOMALEATES

About 100 parts of corn starch were suspended in about 125 parts of tap water. The suspension was stirred and the pH of the resulting slurry was adjusted to and maintained at 7 by the addition of dilute sodium hydroxide solution (3%) while 10 parts of sulfomaleic anhydride were added in small increments. The mixture was allowed to react for about 3 hours at ambient temperature (about 25° C.) and agitation was continued. The pH was adjusted to about 5.5 with dilute hydrochloric acid (3:1), and the reaction product was recovered by filtration, washed three times with water having a pH of about 5–6, and air dried. The resultant half-ester had an ester content (based on the saponification number) of 1.46%.

A starch sulfomaleate half-ester having an ester content of 0.74% was prepared as above except that 3 parts of sulfomaleic anhydride were used and the reaction time was 2 hours.

EXAMPLE II and the preparation of modified starch sulfomaleates using cationic, anionic, and nonionic-crosslinked starch bases.

The derivatives were prepared as in Example I except that those prepared using waxy maize, potato, and tapioca starch bases were suspended in 150 parts instead of 125 parts of water. The reaction conditions and resulting half-esters are described in Table II.

TABLE II

| Starch | | Reaction Conditions | | | | |
|---|---|---|---|---|---|---|
| Designation | Base | Reagent (wt. %) | pH | Temperature (°C.) | Time (hr.) | Derivative Ester (%) |
| A-1 | Corn | 1.0 | 8.0 | 25 | 1.0 | 0.34 |
| A-2 | Corn | 7.0 | 5.0 | 25 | 1.0 | 0.69 |
| A-3 | Corn | 7.0 | 7.0 | 25 | 1.0 | 1.41 |
| A-4 | Corn | 7.0 | 9.0 | 25 | 1.0 | 1.54 |
| A-5 | Corn | 7.0 | 11.0 | 25 | 1.0 | 0.87 |
| B-1 | Waxy Maize | 7.0 | 8.0 | 10 | 1.0 | 2.73 |
| B-2 | Waxy Maize | 7.0 | 8.0 | 25 | 1.0 | 2.30 |
| B-3 | Waxy Maize | 7.0 | 8.0 | 45 | 1.0 | 1.53 |
| C | Tapioca | 7.0 | 7.5 | 25 | 1.0 | 1.45 |
| D | Potato | 7.0 | 8.5 | 25 | 1.0 | 1.44 |
| E | Corn treated with 1.5% diethylaminoethylchloride hydrochloride | 5.0 | 7.0 | 25 | 2.0 | 0.94 |
| F | Corn treated with 3.5% diethylaminoethylchloride hydrochloride | 5.0 | 7.0 | 25 | 2.0 | 0.81 |
| G | Corn treated with 4.5% 3-chloro-2-hydroxypropyl trimethylammonium chloride | 5.0 | 7.0 | 25 | 2.0 | 0.76 |
| H | Corn treated with 2.9% 3-chloro-2-sulfopropionic acid | 7.0 | 8.0 | 25 | 1.0 | 1.35 |
| I | Corn treated with 4.5% propylene oxide and cross-linked with 0.015% phosphorus oxychloride | 7.0 | 8.0 | 25 | 1.0 | 2.40 |

The bases designated E, F, & G were prepared according to the method described in Example III of U.S. Pat. No. 4,243,479 issued Jan. 6, 1981 to M. M. Tessler; the base designated H was prepared according to the method described in Example IV of U.S. Pat. No. 4,243,479; and the base designated I was prepared according to the method of Example III of U.S. Pat. No. 3,904,601 issued Sept. 9, 1975 to M. M. Tessler et al.

This example illustrates the preparation of non-granular starch sulfomaleates prepared according to the process herein using a previously gelatinized starch base.

About 50 parts of an acid hydrolyzed waxy maize starch (85 water fluidity) was suspended in 150 parts of water. The suspension was heated on a boiling water bath for 20 minutes, cooled to the indicated reaction temperature, and the pH of the dispersion containing the thus gelatinized starch was adjusted to 8.0 with alkali. The cooled starch dispersion was stirred while sulfomaleic anhydride was added, and the pH was maintained at 8.0 by the periodic addition of alkali. When the reaction was complete, as indicated by a constant pH, the starch half-ester was purified by dialysis, concentrated on a rotary evaporator, and recovered by precipitation from ethanol. The reaction conditions and resulting half-esters are shown in Table I.

TABLE I

| Reaction Conditions | | | | | |
|---|---|---|---|---|---|
| Reagent (wt. %) | Alkali | pH | Temperature (°C.) | Time (hr.) | Derivative Ester (%) |
| 30 | 13% aqueous KOH | 8.0 | 85 | 1.0 | 0.93 |
| 100 | 13% aqueous KOH | 8.0 | 85 | 1.0 | 3.22 |
| 100 | 25% aqueous NaOH | 8.0 | 25 | 1.0 | 8.81 |

EXAMPLE III

This example illustrates the preparation of starch sulfomaleates using starch bases other than corn starch

EXAMPLE IV

This example illustrates the preparation of a starch disulfosuccinate.

A total of 100 parts of waxy maize starch was suspended in 150 parts water. The suspension was stirred and the pH of the resulting surry was adjusted to and maintained at 8.0 by the addition of 3% aqueous sodium hydroxide solution while 20 parts of sulfomaleic anhydride were added in small increments. When the pH became constant, the starch slurry was divided into two equal parts (Starch A and Starch B).

STARCH A

The pH of the slurry was lowered to 5.5 with dilute hydrochloric acid (about 10%) and the reaction product recovered by filtration, washed with water, and air dried. The resulting product (i.e. the starch sulfomaleate half-ester) was found to contain 3.27% ester substitution (based on the saponification number) and 0.60% sulfur, dry basis. The theoretical sulfur, based on the ester analysis, is 0.58%.

STARCH B

A total of 10 parts of sodium bisulfite was added to the starch slurry, and the reaction mixture stirred at room temperature for 2 hours. The pH was then raised from 4.8 to 5.5 with 3% aqueous sodium hydroxide, and the reaction product recovered in the same manner as above. The resulting product (i.e. the starch disulfosuccinate) was found to contain 0.86% sulfur, dry basis.

The increase in the sulfur content of the reaction product of Starch B in comparison to the reaction product of Starch A shows that the sodium bisulfite has added across the double bond of the starch sulfomaleate half-ester to form the starch disulfosuccinate derivative.

Summarizing, this invention provides novel starch maleates, modified starch maleates, and novel starch disulfosuccinates and a method for the preparation thereof.

Now that the preferred embodiments of the present invention are described in detail, various modifications and improvements thereon will become readily apparent to those skilled in the art. Accordingly, the spirit and scope of the invention are to be limited only by the appended claims, and not by the foregoing specification.

What is claimed is:

1. A starch derivative, comprising a starch sulfomaleate of the general structure:

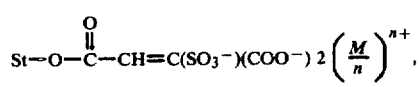

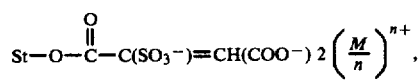

or mixtures of (i) and (ii); wherein St—O— represents a starch molecule or a modified starch molecule, M is a cation, and n is the valence number of M.

2. A starch derivative, comprising a starch disulfosuccinate of the general structure:

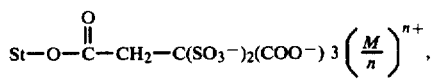

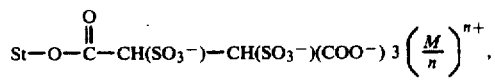

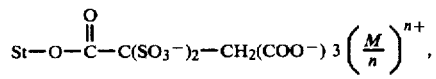

or mixtures of (iii), (iv), and (v); wherein St—O— represents a starch molecule or a modified starch molecule, M is a cation, and n is the valence number of M.

3. The derivative of claim 1 or 2, wherein M is hydrogen, ammonium, an alkali or an alkaline earth metal.

4. The derivative of claim 1, wherein M is sodium or potassium.

5. The derivative of claim 2, wherein M is sodium.

6. The derivative of claim 1 or 2, wherein said modified starch molecule contains cationic, anionic, or nonionic substituent groups.

7. The derivative of claim 6, wherein said cationic groups are diethylaminoethyl ether groups or 3-(trimethylammonium chloride)-2-hydroxypropyl ether groups; said anionic groups are 2-sulfo-2-carboxyethyl ether groups; and said nonionic groups are hydroxypropyl ether groups.

8. The method for preparing the starch sulfomaleate of claim 1, which comprises the steps of:
    (a) reacting a starch base or a modified starch base with about 0.1 to 100% by weight, based on dry starch, of sulfomaleic anhydride; and
    (b) isolating the resultant starch sulfomaleate.

9. The method for preparing the starch disulfosuccinate of claim 2, which comprises the steps of:
    (a) reacting a starch base or a modified starch base with about 0.1 to 100% by weight, based on dry starch, of sulfomaleic anhydride;
    (b) reacting the resultant starch sulfomaleate with about 0.1 to 400% by weight, based on dry starch, of sulfurous acid or the acid salts thereof; and
    (c) isolating the resultant starch disulfosuccinate or mixtures of disulfosuccinate and starch sulfomaleate.

10. The method of claim 8 or 9, wherein said modified starch base is prepared by reacting a starch base with a cationic, anionic, or nonionic reagent.

11. The method of claim 10, wherein said cationic reagent is 2-diethylaminoethyl chloride hydrochloride or 3-chloro-2-hydroxypropyl trimethylammonium chloride; said anionic reagent is 3-chloro-2-sulfopropionic acid; and said nonionic reagent is propylene oxide.

12. The method of claim 8, wherein said reaction is carried out in an aqueous medium at a pH of about 5-9 and at a temperature of about 5°-90° C. for about 0.5-20 hours or at a pH of about 9-11 and at a temperature of about 5°-30° C. for about 0.5-3 hours.

13. The method of claim 12, wherein said reaction is carried out at a pH of about 6-9 and at about 20°-45° C. for about 1-6 hours with about 1-20% of sulfomaleic anhydride.

14. The method of claim 9, wherein said step (a) is carried out in an aqueous medium at a pH of about 5-9 and at a temperature of about 5°-90° C. for about 0.5-20 hours or at a pH of about 9-11 and at a temperature of about 5°-30° C. for about 0.5-3 hours and step (b) is carried out in an aqueous medium at an initial pH of about 5-8 and at a temperature of about 5°-50° C. for about 1-6 hours.